United States Patent [19]
Narang

[11] 4,269,451
[45] May 26, 1981

[54] WHEEL AND TIRE BALANCING SYSTEM

[76] Inventor: Rajendra K. Narang, 1525 Bonnie Rd., Macedonia, Ohio 44056

[21] Appl. No.: 931,205

[22] Filed: Aug. 4, 1978

Related U.S. Application Data

[63] Continuation-in-part of Ser. No. 807,371, Jun. 17, 1977, abandoned.

[51] Int. Cl.³ .............................................. B60B 13/00
[52] U.S. Cl. .............................. 301/5 B; 301/5 BA; 74/573 R; 74/573 F
[58] Field of Search ............... 301/5 B, 5 BA, 6 WB, 301/37 ST; 74/573 R, 573 F; 51/169; 241/292; 295/6; 152/330 R, 236, 237

[56] References Cited

U.S. PATENT DOCUMENTS

| | | | |
|---|---|---|---|
| 1,486,055 | 3/1924 | Stranahan et al. | 301/5 B |
| 1,677,855 | 7/1928 | Swain | 301/5 B |
| 1,769,903 | 7/1930 | Baker | 301/6 WB |
| 2,529,099 | 11/1950 | Olbrys | 301/5 B |
| 2,632,673 | 3/1953 | Pfeiffer | 74/573 X |
| 2,659,243 | 11/1953 | Darrieus | 74/573 |
| 2,915,335 | 12/1959 | Barnes | 301/37 ST |
| 3,002,388 | 10/1961 | Baleman | 301/5 B X |
| 3,191,997 | 6/1965 | Colvert | 301/5 BA |
| 3,462,198 | 8/1969 | Onufer | 301/5 BA |
| 3,464,738 | 9/1969 | Pierce | 301/5 BA |

FOREIGN PATENT DOCUMENTS

| | | | |
|---|---|---|---|
| 1912951 | 9/1970 | Fed. Rep. of Germany | 301/5 B |
| 755447 | 9/1933 | France | 301/5 B |
| 1235022 | 5/1960 | France | 301/5B |
| 528738 | 6/1965 | Italy | 301/5 B |
| 13139 | of 1895 | United Kingdom | 301/5 B |
| 1066818 | 4/1967 | United Kingdom | 301/5 BA |

*Primary Examiner*—Charles A. Marmor
*Attorney, Agent, or Firm*—Maky, Renner, Otto & Boisselle

[57] ABSTRACT

A balancing system for a wheel having a tire mounted on the rim thereof consists of at least one and as many as three balancing components including rim mounted weights, an annular member including a balancing medium positioned within the tire, and a shock absorber between the wheel and brake drum. The weights are relatively narrow in width and elongated in length and are mounted on the rim to extend predominantly radially of the tire sidewall rather than circumferentially. The annular member is suspended from the tire within the radially outer portion of the air cavity of the tire and during rotation of the tire automatically corrects for imbalance by circumferential migration of the balancing medium and/or annular member to the area of imbalance and/or by radial displacement of the annular member.

15 Claims, 10 Drawing Figures

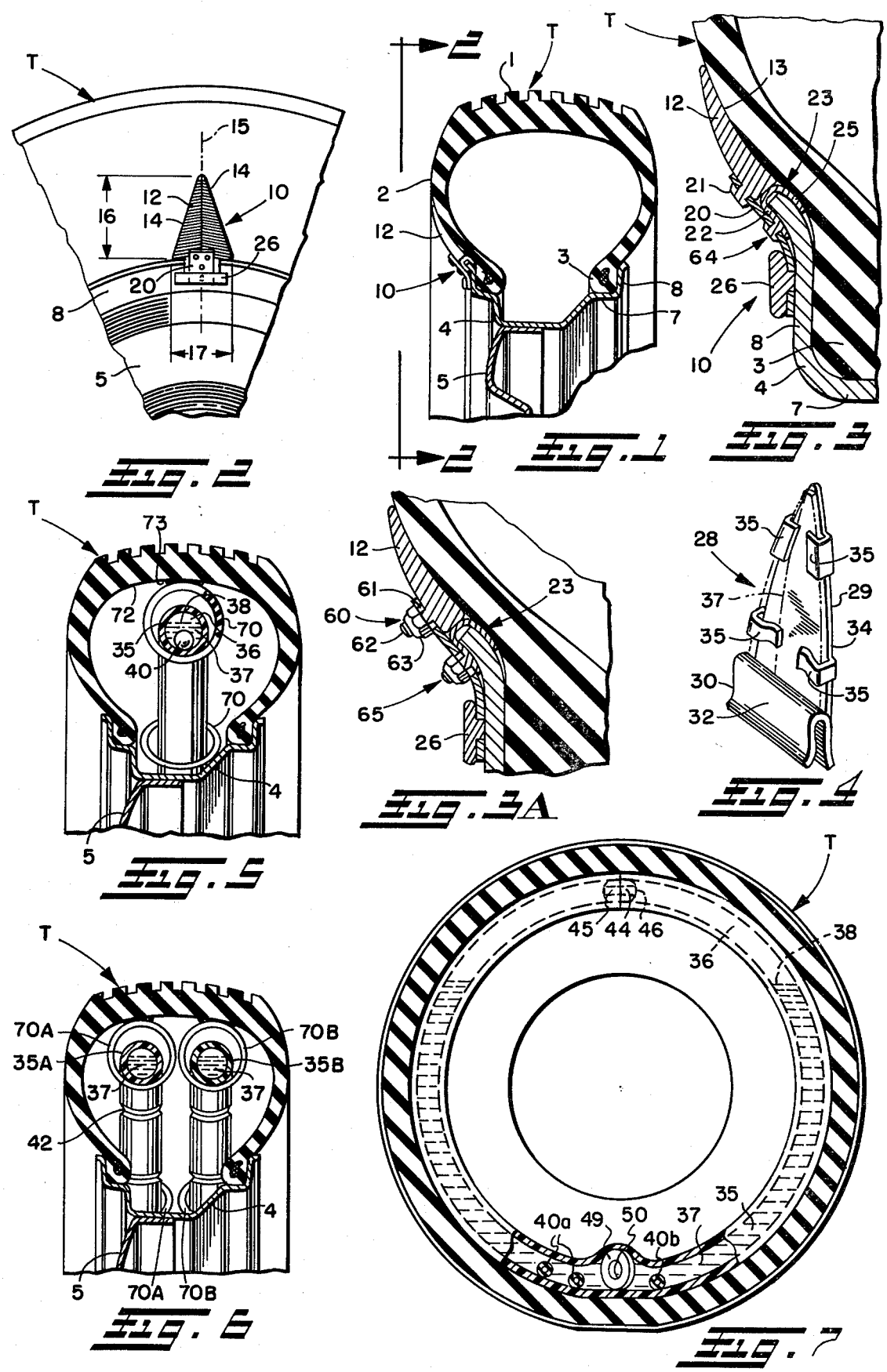

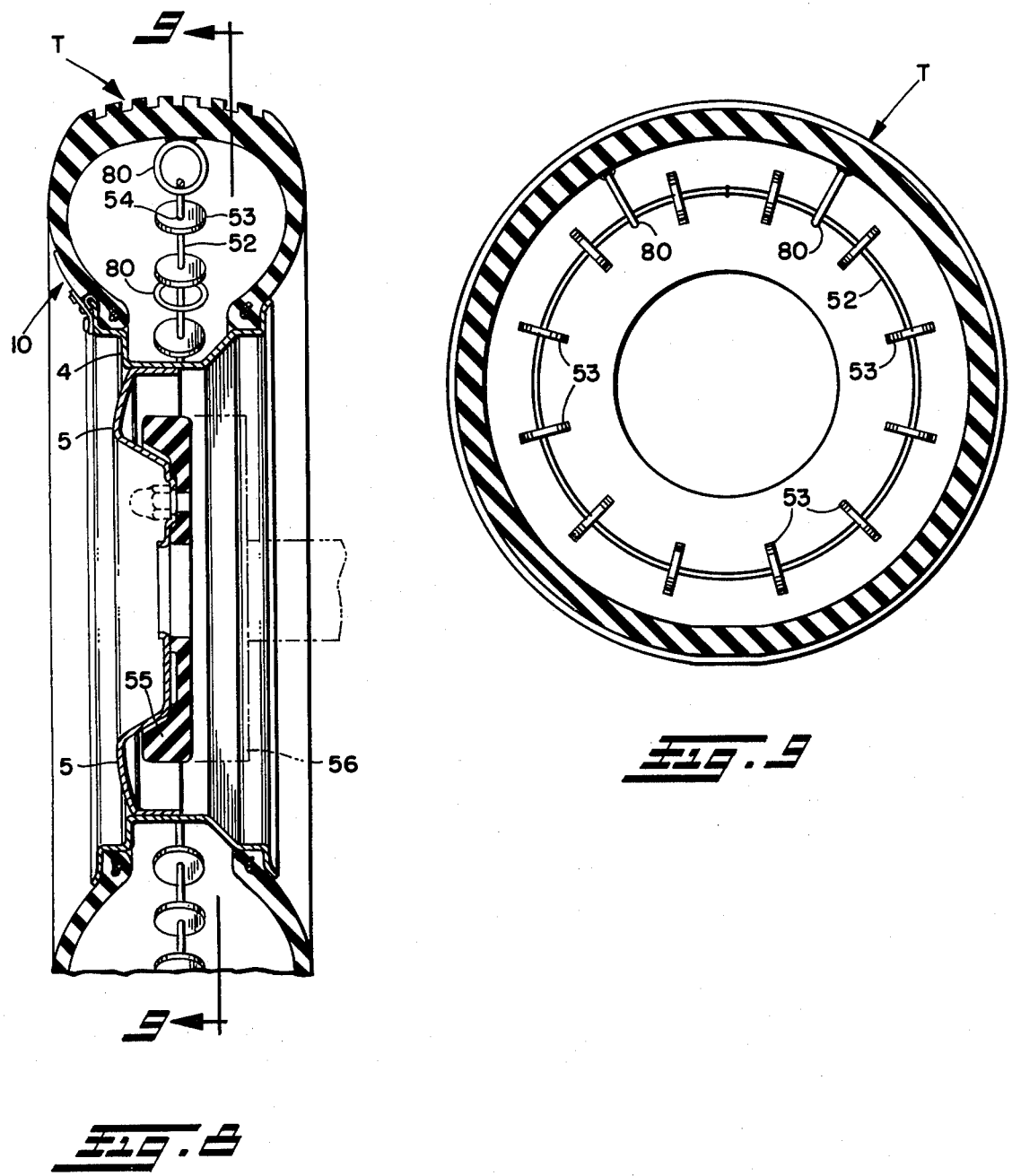

WHEEL AND TIRE BALANCING SYSTEM

BACKGROUND AND SUMMARY OF THE INVENTION

This application is a continuation-in-part of now abandoned application Ser. No. 807,371, filed June 17, 1977.

The present invention relates as indicated to a wheel and tire balancing system in general and to the specific or cooperatively usable components of such system in particular.

Various structural devices have been proposed and/or used over the years to improve the balance of a rotating wheel having a conventional pneumatic tire mounted thereon. One standard commercially available product for balancing wheels and tires is a circumferentially extending weight that may be clipped or clamped onto the rim flange. Such circumferentially extending weight is selectively placed on the rim at a location generally corresponding to the radial location indicated by the wheel balancing machine. Such weight generally improves the wheel balance but may not optimize the desired balancing because the circumferential extent and center of gravity of the weight may not coincide with the radial wheel location indicated for optimum balancing purposes.

Other known structural balancing devices are annular shot, aggregate or fluid chambers carried by the wheel or rim thereof which permit the shot, aggregate or fluid circumferentially to migrate to the radial location of imbalance. Such chambers are generally mounted in direct physical contact with the wheel at its rim or in the well of the rim and may require special installation techniques and tools and/or preclude the use of conventional rim mounted decorative and/or protective hub caps. Furthermore, the attachment means for securing the annular chamber to the wheel are generally expensive and make the assembly of the balancing device on the wheel difficult. Moreover, such chambers have generally circumferentially continuous or uniform cross sections.

Still other approaches at balancing wheels and tires include inserting a non-hardening fluid weighting material in the tire.

The principal object of the present invention is to provide a system of components that can be used alone or in combination, as required, to optimize wheel and tire balance.

It is another object of the present invention to have as one of such components a weight mounted on the rim extending primarily radially of the wheel along the sidewall of the tire. Such predominant radial configuration and orientation permits the additive weight to be concentrated along the indicated radial line of imbalance.

It is still another object of the present invention to provide an annular member or members carrying or containing a circumferentially adjustable mass or masses, such member or members being suspended from the tire within the tire cavity at its radially outer portion to permit migration of the annular member of members and/or mass or masses to the area of imbalance and/or radial displacement of the annular member relative to the tire. Such circumferential migration may be controlled and damped to permit radial concentration of mass at the point of imbalance and to control the rate of movement.

It is yet another object of the present invention to provide an automatically adjusting vehicle wheel and tire balancing system that does not interfere with conventional practices for mounting of the tire on the wheel and/or preclude the securiment of decorative or protective coverings to the wheel at its rim.

It is a further object of the present invention to provide a relatively inexpensive and easily installed automatically adjusting wheel and tire balancing system.

It is still a further object of the present invention to provide an automatically adjusting wheel and the tire balancing system that can correct for relatively greater amounts of imbalance with less added weight.

It is yet a further object of the present invention to provide a resilient or shock absorbing structure between the wheel and brake drum to isolate the wheel from potential shimmy or axial imbalance and to eliminate metal to metal contact to minimize transmission of wheel vibrations to the vehicle and passenger. Such resilient structure for axial balancing may cooperate with the other components providing radial balancing to result in a well balanced wheel in all planes of operation.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE DRAWINGS

In said annexed drawings:

FIG. 1 is a cross-section of the rim and tire mounted thereon with the predominantly radially extending weight mounted on such rim;

FIG. 2 is a partial side elevation of the rim and tire taken along line 2—2 in FIG. 1 showing the position of the weight on the rim and the radial extension thereof along the tire sidewall;

FIG. 3 is an enlarged cross-section of the rim and tire bead showing the details of construction for the radially extending weight;

FIG. 3A is an enlarged cross-section similar to FIG. 3 but showing the radially adjustable and/or replaceable connection between the main body and mounting strap and between the mounting strap and clip;

FIG. 4 is a perspective view of a holder adapted selectively to receive variously sized weights;

FIG. 5 is a cross-section of a tubeless pneumatic tire mounted on a rim showing a wheel balancingd tube positioned within the tire cavity;

FIG. 6 is a cross-sectional view of the rim andd tire similar to FIG. 5 showing two balancing tubes within the tire cavity, with such tubes having flow control constrictions;

FIG. 7 is a partially broken away and sectioned side elevation of another embodiment of the invention;

FIG. 8 is a cross-section of a pneumatic tire mounted on a drop center rim connected to the wheel showing a balancing system consisting of radially extending weights, circumferentially adjustable weights suspended within the tire and a shock absorbing member between the wheel and brake drum; and FIG. 9 is a section view of the system of FIG. 8 taken along the line 9—9 thereof with the wheel details omitted.

DETAILED DESCRIPTION OF THE PREFERRED EMBODIMENTS

Referring now in more detail to the drawings, the present invention consists of a number of different balancing components for a tubeless tire mounted on a rim of a wheel. Such components, which may be individually or collectively employed, include radially extending weights (FIGS. 1-4 and 8), circumferentially adjustable masses contained within the tire (FIGS. 5-9), resilient shock absorbing material between the wheel and brake drum (FIG. 8) and/or combinations thereof (as exemplified in FIG. 8).

Turning first to FIGS. 1-3A, a conventional tubeless tire T having a tread 1, sidewalls 2 and beads 3 is mounted on a rim 4 (of any type) carried by wheel 5. Such rim has bead seats defined by axially outwardly extending support portions 7 and radially outwardly extending rim flanges 8.

The tire T as thus mounted may be tested on a balancing machine to determine the specific radial location or locations requiring the addition of a weight to result in a balanced wheel. Rather than using a circumferentially extending conventional weight, the present invention contemplates the use of a predominantly radially weight that may be mounted at the precise location indicated for the specific balancing purpose. Such radially extending weight, which is indicated generally at 10, includes a main body portion 12 having a curved axially inner face 13 conforming to the contour of the lower sidewall of the mounted tire T. Such main body portion 12 preferably decreases in thickness from its radially inner to its radially outer end so that the latter may be substantially tangentially oriented with respect to the outer surface of sidewall 2. Moreover, the body portion 12 decreases in thickness from its center to its lateral edges 14 so that the weight is concentrated along its central, radially outwardly extending axis 15. The radial extent or length 16 of the main body portion is substantially greater than the circumferential width 17 of the main body portion, with the preferable shape therefor in elevation being an arrowhead as shown, although other shapes having predominant radial extension are also within the scope of the invention.

The radially inner portion of the main body 12 is connected to the radially outer end of a mounting strap 20 which may be a permanent connection as shown at 21 in FIG. 3 or a radially adjustable and/or replaceable connection as generally shown at 60 in FIG. 3A including a radially elongated slot 61 in the strap that receives a threaded shank 62 formed on the main body 12 on which is tightened nut 63. The axially outer leg 22 of a rebent rim attachment clamp, indicated generally at 23, is connected to mounting strap 20 intermediate its ends by a permanent connection as shown at 64 in FIG. 3 or a radially adjustable and/or replaceable connection as generally shown at 65 in FIG. 3A which is substantially the same as the connection 60. The axially inwardly extending curved leg 25 of the rim clamp 23 is received between the tire bead and the axially inner face of the rim flange and tightly held in such position by the air pressure within tire T. The throat of the attachment clamp 23 is normally equal to or slightly smaller than the width of rim flange 8 requiring the same to be press fit onto such flange slightly resiliently to spread leg 25 into clamping engagement therewith to assist the tire pressure in positively maintaining the balancing weight in the desired position. Such clamp member thus permits the tire weight 10 selectively to be secured to the rim flange 8 at the desired location indicated by the balancing machine. Moreover, the radially inner end of strap 20 may have a counterbalance weight 26 mounted thereon to assist in maintaining the weight 10 on the rim, to increase the effective radial length of the weight, and to provide a surface for driving the clamp into its mounted position.

Instead of the radially adjustable and/or removable connection between the main body 12 and strap 20, a specially configured mounting bracket 28 shown in FIG. 4 may be used having a weight support plate 29 and a downwardly facing rim clamp channel 32. Such rim clamp channel may be formed as a separate piece spot welded or brazed to support plate 29 or may be formed integrally with support plate 29 and rebent into the required clamping orientation. The lateral edges 34 of support plate 29 are provided with two sets of opposed inwardly extending attachment tabs 35 that may selectively be inwardly bent to engage and retain a weight 37 positioned in the pocket formed between the tabs and plate. The size of the weight 37 is selected according to the balancing function required.

Turning now to FIGS. 5-9, the annular member or members containing the circumferentially variable mass or masses within the tire to accomplish the balancing function may take several different forms, with respresentative alternative forms being illustrated in such Figures. For example, in FIG. 5, an annular hollow tube 35 is positioned within the tire T and is preferably suspended in the tire cavity by rings 70 secured at their radially outer edges to the radially inner surface 72 of the axially extending or tread portion of the tire. At least two such rings are provided and may be secured to the tire by a suitable adhesive 73 or other suitable means with the ring axes orientated substantially normal to the axis of the annular tube and preferably centrally disposed relative to the sidewalls 2 of the tire. The rings 70 preferably have an inner diameter greater than the outer diameter of the tube 35 whereby the tube, during operation, may become eccentrically (radially) displaced relative to the tire and wheel and towards or away from the radial area of imbalance for correctional purposes. The rings essentially suspend the tube within the tire air cavity while providing sufficient contact between the tube and the rotating tire to cause the tube to rotate along with the tire.

It will be appreciated that the tube 35 is supported within the radially outer portion of the tire cavity. Such positioning of the tube eliminates any interference therewith during conventional mounting of the tire on the wheel. The tube need only be inserted and secured within the tire cavity and the tire then mounted in conventional fashion. In addition to eliminating any mounting interference, the greater radial displacement of the mass of the tube and its contents discussed below provides for correction with less added weight of relatively greater amounts of imbalance than previously attainable in many known systems.

If desired, the hollow tube 35 may be of non-uniform diameter along its circumferential extent. Such non-uniformity in diameter enables the thicker and heavier portion of the tube centrifugally to locate itself within the tire at the circumferential position of imbalance by sliding through the rings, with the thinner and lighter part of the tube counterbalancing the whole system in motion, without adding too much weight to the system.

Instead of using rings 70, the tube 35 may be otherwise supported in the tire in the radially outer portion of the tire cavity. For example, as seen in FIG. 7, the tube may be dimensioned to snugly fit against the inner surface 72 of the tread portion of the tire. However, radial displacement and sliding of the tube within the tire is precluded and correction for any imbalance is obtained by migration of the balancing medium in the tube as described below. In any case, the tube preferably is made of a plastic or rubber compound of sufficient flexibility to flex when the tire is radially depressed as by engagement with road hazards, but of sufficient rigidity to maintain generally its annular shape at other times.

The hollow tube 35 defines a chamber 36 preferably having a liquid 37 at least partially filling the same as indicated by the liquid level line 38. Such liquid may be antifreeze, oil, hydraulic fluid, glycerine or other fluid suitable to the tire environment and the balancing function performed. By being partially filled, the fluid can flow by centrifugal force during rotation of the wheel to the radial area of imbalance of such wheel for correctional purposes.

In addition to the liquid 37, the chamber 36 within the uniform or non-uniform diameter tube may contain a plurality of balls 40 having a diameter less than the inside diameter of the tube. Such balls preferably have a metallic core for weight purposes and a rubber or synthetic cover or skin to reduce the sound level incident to wheel operation. Preferably, enough rubber balls 40 are inserted into the liquid in chamber 36 to have the cumulative weight thereof equal to or slightly greater than the weight of the liquid 37.

If desired, the number of rubber balls 40 included within the chamber of the tube may be limited to three wherein two are of equal weight and one of greater weight, with the two lighter balls having a cumulative weight equal to the weight of the heavier ball. The three balls in total preferably should have a weight equal to or slightly greater than the weight of the liquid in the tube. With such three-ball arrangement having one of twice the weight of the others, the wheel balancing is enhanced by the heavier ball migrating to the radial location of greatest imbalance.

Turning to FIG. 6, two tubes 35A and B are shown suspended respectively by pairs of O-rings 70A and 70B within the tire cavity for balancing purposes in a manner similar to the tube 35 and are axially spaced relative to one another. Such tubes are provided with a plurality of circumferentially spaced, annular indentations 42 to provide flow restrictors for the liquid 37 contained therein. Such flow restrictors reduce the possibility of a sudden circumferential rush of the fluid during acceleration, normal operation and/or deceleration and also assist in concentrating the liquid at a given radial location of imbalance. Although two tubes are shown in FIG. 6, it will be appreciated that additional tubes may be suspended in the described manner within the tire so as not to contact either the tire or the rim during operation, if required for proper balancing. Moreover, it will also be appreciated that other structural forms of flow restrictors, such as spherical rings and burrs, could be used with the tube for the same functional result.

In FIG. 7, a tube 35 is illustrated having an open end 44 and a closed end 45 with a male projection 46 extending outwardly from the latter. Such tube is initially filled to the desired level 38 with liquid 37 and then the ends thereof are joined by telescopically inserting the male projection 46 of the closed end 45 into the open end 44 to result in an annular balancing tube for placement in the tire cavity. A washer 49 having a hole 50 in the center thereof may be positioned in the chamber 36 defined by such tube, with such hole being provided for the fluid control purposes as described above. In addition, two light steel core balls 40a having a coating thereon may be positioned on one side of the flow control washer, and one heavy steel ball 40b on the other side, or single balls of equal weight on each side, with the cumulative weight of such balls and washer being equal to or greater than the fluid weight for the reasons set forth above. By having such balls on opposite sides of washer 49, the balls are constricted in their circumferential movements by the closed end tube and washer and act to counterbalance one another in the overall system.

Turning now to FIGS. 8 and 9, still another form of balancing system suspended within the tire is disclosed. In such Figures, an annular wire 52, supported by a pair of O-rings 80 secured to the tire in the manner described above in connection with the annular tube 35, has a plurality of circumferentially spaced washers 53 mounted thereon. The rings are of a diameter greater than the radius of the washers so that the annular wire may become eccentrically displaced towards or away from the radial area of imbalance for correctional purposes. The rings essentially suspend the wire within the outer portion of the tire cavity while providing sufficient contact between the wire and tire to rotate the wire along with the tire.

The rubber washers 53 have central holes 54 therein substantially equal in diameter to the diameter of the wire to afford a frictional fit therebetween. However, during operation of the wheel and tire, such frictional fit does not preclude migration of such washers 53 to a radial area of imbalance caused by the circumferential forces experienced during wheel rotation. Such washers 53 may have a steel or nylon core coated with a layer of rubber to reduce the sound of operation.

As illustrated in FIG. 8, such wire 52 with washers 53 mounted thereon is being employed in conjunction with the predominantly radially extending weights 10 and with a layer of resilient shock absorbing material to provide a balancing system. The resilient, shock absorbing material 55 of rubber or the like has its axially inner and outer faces configuredd to mate with the corresponding faces on the brake drum 56 and wheel, respectively. Such resilient material is used to avoid metal to metal contact thereby to reduce and/or stabilize shimmying or axial imbalance that would normally be directly transmitted from the brake drum and axle to the wheel. Such axial stabilization in conjunction with the radial stabilization provided by the circumferentially variable mass and/or radially extending weight may improve the over-all balance of particular wheels.

The embodiments of the invention in which an exclusive property or privilege is claimed are defined as follows:

1. In combination with a wheel having a rim upon which a tire is mounted, means to balance such wheel comprising at least one weight having a main body portion that is elongated, clip means cooperating with said main body portion to mount the weight to the rim so that the elongated main body portion extends predominantly radially of the wheel and tire, a mounting strap having the main body portion connected to the radially outer end thereof and the clip means to an intermediate portion thereof, and a counterbalancing body on the radially inner end of the mounting strap to increase the effective radial length of the weight.

2. In combination with a wheel having a rim upon which a tire is mounted, means to balance such wheel comprising at least one weight having a main body portion that is elongated, clip means cooperating with said main body to mount the weight to the rim so that the elongated main body portion extends predominantly radially of the wheel and tire, and a mounting strap having the main body portion connected to the radially outer end thereof and the clip means to an intermediate portion thereof, said main body portion being releasably and radially adjustably mounted to said strap to permit the main body portion to be replaced and adjusted as required.

3. In combination with a wheel having a rim upon which a pneumatic tire is mounted, wheel balancing means comprising at least one annular flexible tube, means for positioning said tube in the radially outer portion of the air cavity of said pneumatic tire and radially outwardly of said wheel rim and for connecting the tube to the inner surface of the tire to effect common rotation of said tube and tire, and circumferentially adjustable mass means partially filling said tube for continuously migrating to a radial position of imbalance under influence of centrifugal force during rotation of the wheel and tire.

4. The wheel balancing means of claim 3 wherein said tube is dimensioned to fit snugly against the interior surface of the tire.

5. The wheel balancing means of claim 4 wherein said circumferentially adjustable mass means is a liquid.

6. The wheel balancing means of claim 5 wherein the tube is of varying diameter along its circumferential extent.

7. The wheel balancing means of claim 6 wherein said tube has at least one restriction therein to control the migratory flow of the liquid.

8. The wheel balancing means of claim 5 wherein said tube is formed into annular shape by placing a male extension at one closed end of the tube into the other open end of such tube.

9. The wheel balancing means of claim 5 wherein a plurality of balls having a diameter less than the inside diameter of the tube are placed in the liquid for circumferential movement therein, the cumulative weight of said balls being equal to or greater than the weight of the liquid.

10. The wheel balancing means of claim 9 wherein two balls of equal weight and a third ball of a weight equal to or greater than the cumulative weight of said other two balls are positioned in said liquid in said tube.

11. The wheel balancing means of claim 9 wherein restriction means are placed between some of said balls to control the liquid flow and to limit the movement of said balls.

12. The wheel balancing means of claim 9 wherein said balls have a steel core and a rubber covering to provide the necessary weight while limiting the noise of operation.

13. In combination with a wheel having a rim upon which a pneumatic tire is mounted, means to balance such wheel comprising at least one weight having a main body portion that is elongated, clip means cooperating with said main body portion to mount the weight to the rim so that the elongated main body portion extends predominantly radially of the wheel and tire, and a mounting member having the main body portion connected to the radially outer end thereof and the clip means to a radially inner portion thereof, said main body portion being generally of arrowhead configuration with the point thereof being at the radially outer end relative to the wheel and tire, and said clip means including an attachment clamp adapted to be press fit onto the rim; and circumferentially adjustable mass means positioned during operation within the pneumatic tire cavity radially outwardly of the wheel rim, said mass means including at least one annular tube partially filled with liquid that is circumferentially adjusted by centrifugal force during rotation of said wheel and tire, and means for connecting said tube to the inner surface of the tire to effect common rotation of said tube and tire.

14. The wheel balancing means of claim 13 wherein said wheel is mounted on a brake drum and resilient means is interposed between said wheel and said brake drum, with the axially inner and outer faces thereof respectively conforming to the facing surfaces of the brake drum and wheel.

15. In combination with a wheel having a rim upon which a tire is mounted, means to balance such wheel comprising at least one weight having a main body portion that is elongated, clip means cooperating with said main body portion to mount the weight to the rim so that the elongated main body portion extends predominantly radially of the wheel and tire, and a mounting member having the main body portion connected to the radially outer end thereof and the clip means to a radially inner portion thereof, said main body portion being generally of arrowhead configuration with the point thereof being at the radially outer end relative to the wheel and tire, said clip means including an attachment clamp adapted to be press fit onto the rim, and said mounting member including a support plate with fasteners releasably to retain said main body portion and a rebent radially inner portion to form said clip means, said fasteners being a plurality of deformable attachment tabs that may be bent inwardly to engage and retain said main body portion to said support plate.

* * * * *